United States Patent
Agarwal et al.

(10) Patent No.: US 8,423,512 B2
(45) Date of Patent: Apr. 16, 2013

(54) LEVERAGING XML CAPABILITIES OF A DATABASE TO ENHANCE HANDLING OF DOCUMENT DATA

(75) Inventors: Nipun Agarwal, Santa Clara, CA (US); Cem Emre Sozgen, Palo Alto, CA (US); Sam Idicula, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 12/555,252

(22) Filed: Sep. 8, 2009

(65) Prior Publication Data

US 2011/0060767 A1 Mar. 10, 2011

(51) Int. Cl.
*G06F 7/00* (2006.01)
(52) U.S. Cl.
USPC ............ 707/661; 707/665; 707/667; 707/670
(58) Field of Classification Search ......................... None
See application file for complete search history.

(56) References Cited

U.S. PATENT DOCUMENTS

| | | | |
|---|---|---|---|
| 5,787,449 A | 7/1998 | Vulpe et al. | |
| 2002/0156772 A1* | 10/2002 | Chau et al. ........................ | 707/3 |
| 2002/0184260 A1 | 12/2002 | Martin et al. | |
| 2003/0140308 A1* | 7/2003 | Murthy et al. ................ | 715/500 |
| 2004/0181679 A1* | 9/2004 | Dettinger et al. ............. | 713/193 |
| 2005/0021548 A1 | 1/2005 | Bohannon et al. | |
| 2005/0108283 A1* | 5/2005 | Karimisetty et al. ...... | 707/104.1 |
| 2005/0172217 A1 | 8/2005 | Leung | |
| 2005/0187969 A1* | 8/2005 | Chaudri .................... | 707/103 R |
| 2005/0268215 A1 | 12/2005 | Battagin et al. | |
| 2006/0036612 A1* | 2/2006 | Harrop et al. ................. | 707/100 |
| 2006/0230075 A1* | 10/2006 | Greef et al. ................... | 707/200 |
| 2008/0016041 A1 | 1/2008 | Frost et al. | |
| 2008/0028288 A1 | 1/2008 | Vayssiere et al. | |
| 2009/0012974 A1 | 1/2009 | Cassidy | |

OTHER PUBLICATIONS

Oracle® Application Server Portal, User's Guide, 10g Release 2 (10.1.4), Chapter 19 "Using WebDAV Clients with OracleAS Portal", Document No. B13809-04, Oracle Technology Network, published Sep. 2005, 34 pages.
Oracle® Call Interface, Programmer's Guide, 10g Release 2 (10.2), Chapter 4 "Using SQL Statements in OCI", Document No. B14250-02, Oracle Technology Network, published Nov. 2005, 17 pages.
Shao et al, "Triggers over XML Views of Relational Data", dated 2005, 26 pages.

(Continued)

*Primary Examiner* — Debbie Le
*Assistant Examiner* — Anh Tai Tran
(74) *Attorney, Agent, or Firm* — Hickman Palermo Truong Becker Bingham Wong LLP

(57) ABSTRACT

When an XML-annotated document is saved, a process automatically stores the document's data in the tables of a database. The database server validates the document's data against a user-specified XML schema. Queries can be executed against a set of documents in order to find documents in which a specified XML element contains specified content. Query results can be customized to return only the contents of specified XML elements. The document data can be linked with other data in the database such that the document data is updated based on the other data every time that the document is opened, thereby producing a "live" and dynamic document. Different file formats can be generated based on the document data, thus separating the presentation of the document data from the data itself. Contents of different elements may be obscured based on users' privileges, thereby maintaining the privacy of the document's information.

20 Claims, 6 Drawing Sheets

OTHER PUBLICATIONS

McFedries, Paul, "Excel PivotTables and PivotCharts", published Oct. 5, 2007, 28 pages.
Microsoft, "About Importing Data", copyright 2012, 3 pages.
Microsoft, "Top 10 Reasons to use Access with Excel", copyright 2012, 12 pages.
Microsoft, "Viewing an XML file in Excel", dated 2002, 2 pages.
Oasis, Open Document Format for Office Applications (OpenDocument) v1.1, Oasis Standard, Feb. 1, 2007, Chapter 17, pp. 709-719.
U.S. Appl. No. 11/959,398, filed Dec. 18, 2007.

* cited by examiner ered documents such as, for example, Microsoft Word documents, Microsoft Excel spreadsheets, Microsoft PowerPoint presentations, etc. A user can define an XML schema within his document. Microsoft Office allows the user to insert XML tags from the XML schema into the document, thereby annotating the document. For example, if the XML schema defines a "name" element, and if the document includes an actual name, then a user may attach the "name" element to the name (typically, causing the name to be enclosed within opening and closing XML tags), thereby creating metadata that identifies that particular portion of the document's data as being a name specifically.

LEVERAGING XML CAPABILITIES OF A DATABASE TO ENHANCE HANDLING OF DOCUMENT DATA

FIELD OF THE INVENTION

The present invention relates generally to Extensible Markup Language (XML) and the storage and enhanced handling of user-created data within a database system that is designed to store and handle XML-formatted data.

BACKGROUND

Microsoft Office 2007 stores content as XML conforming to a schema. XML content may be found within user-generated documents such as, for example, Microsoft Word documents, Microsoft Excel spreadsheets, Microsoft PowerPoint presentations, etc. A user can define an XML schema within his document. Microsoft Office allows the user to insert XML tags from the XML schema into the document, thereby annotating the document. For example, if the XML schema defines a "name" element, and if the document includes an actual name, then a user may attach the "name" element to the name (typically, causing the name to be enclosed within opening and closing XML tags), thereby creating metadata that identifies that particular portion of the document's data as being a name specifically.

Microsoft Office stores the document in a file system as a compressed archive of multiple XML files. Typically, one of the XML files contains the document data itself, including any XML annotations that the user has made using the technique discussed above, while the rest of the XML files contain information regarding formatting, presentation, and other aspects of the document. For example, these additional XML files may describe information relating to fonts used in the document, multiple character set support, templates, etc. Microsoft Office 2007 documents conform to the Office Open XML format. Microsoft Office 2007 also supports the Open Document Format, which is another schema-based XML format.

Prior to Microsoft Office 2003, Microsoft editors (such as earlier editions of Microsoft Word) stored data in a binary, proprietary format. These editors (which are also called "document editing applications" herein) would store these binary files in a standard file system rather than a database system. Storing data in a file system instead of a database system has some distinct disadvantages. For example, a file system generally lacks the scalability that a database system provides in the quantity of data that can be stored. Existing database systems are capable of efficiently storing and searching petabytes of data. Database systems have also been able to provide reliability and high availability features that most file systems have usually lacked. However, because traditional file systems have, at least in the past, satisfied the rather simple needs of most users of document editors, documents traditionally have been stored in file systems.

In 2003, Microsoft Office started storing document data in an XML format rather than the binary format mentioned above. Database systems are much better at parsing and understanding XML-formatted data than they are at parsing and understanding data that is in a binary format. Data stored in a binary format is usually little more than a stream of bytes that cannot be interpreted. XML, in contrast, is a format that many database systems can understand natively.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Overview

Figure 1:
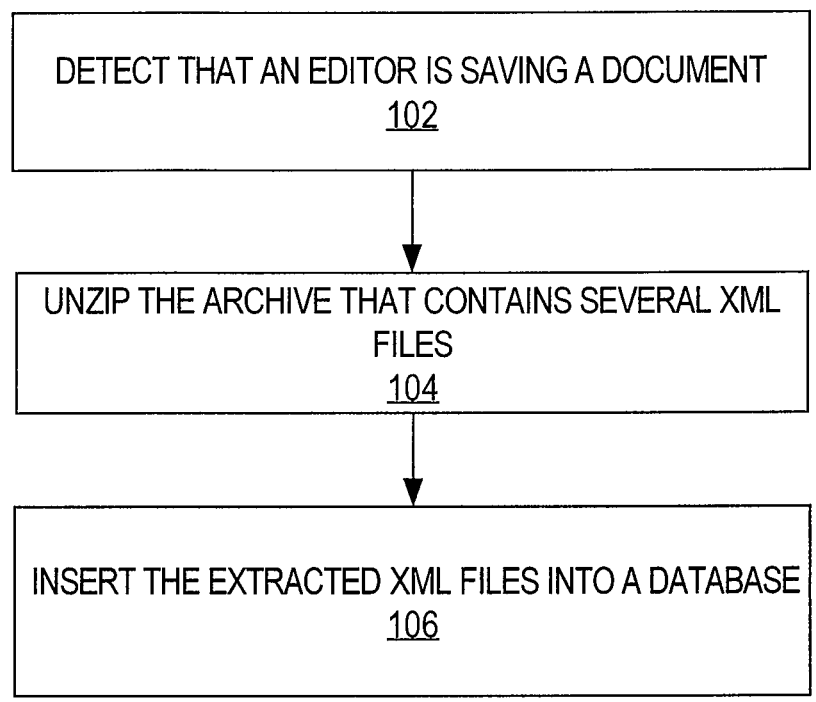
FIG. 1 is a flow diagram that illustrates an example of a technique for storing XML document data into a database, according to an embodiment of the invention.

In one embodiment of the invention, XML-formatted documents are stored in a database. Because such documents are stored in an XML-compatible format within the database, the documents can be enhanced with various features that would not have been available if the documents had been stored in a file system instead. Additionally, because such documents are stored in an XML-compatible format within the database, operations can be performed more efficiently on the documents—operations that could not have been performed efficiently if the documents had been stored in a file system instead.

For example, validation can be performed more efficiently relative to XML-formatted documents stored in a database. Validation involves an automatic determination of whether a document's data actually does conform to the rules that are specified within a particular XML schema; if the document's data does conform, then the document is considered to be valid, while if the document's data does not conform, then the document is not considered to be valid.

For another example, XML-formatted documents that are stored in a database can be queried with greater efficiency than documents stored in a file system could be queried. When XML-formatted documents are stored in a database, the semantics of those documents can be exploited by queries executed relative to those documents. The much higher queriability of XML-formatted documents stored in a database may be contrasted to the relatively low queriability of binary documents that are stored in a file system, in which the contents of those documents are essentially a "black box" into which a query cannot look.

Because more recent editions of Microsoft Office now store documents in a schema-based XML format, users have much more incentive to store those documents in a database rather than in a file system. As is discussed above, the database permits enhanced features and operations that a file system does not.

Single Storage System for all Data

In the past, the vast majority of data has been unstructured data, and that data has been stored in a file system. The minority of data has been in the form of structured data, and that data has been stored separately in a database. Consequently, some information has been accessible via a database query, but other information has not been. For example, an employee's information, such as the employee's department, manager, and compensation level, might in the past have been stored as structured data in a database. However, other information that one might have wanted to obtain about the employee, such as the quantity of documents or functional specifications that the employee authored in a specific year, might not have been stored in the database. The documents themselves would have been stored in a file system. Therefore, there was, in the past, no simple way of determining information such as the quantity of documents that an employee authored in a specific year.

However, once formerly unstructured data is moved into a database and stored alongside the structured data, relations between the formerly unstructured data and the data already contained in the database can be formed. Because a single system then stores all of the content (rather than having the content being divided up between a file system and a database system), all of the data becomes highly queriable. For example, after all of the documents and functional specifications that were formerly stored in a file system have been moved into a database system, it becomes much easier to execute a query relative to the data to determine how many documents or functional specifications a particular employee authored during a specified year. Thus, it becomes very desirable to store data, such as user-authored document data, in a database rather than a file system.

Storing XML Documents in a Database System

Microsoft Office 2007 saves Word documents with a ".docx" extension rather than a simple ".doc" extension. This signifies, among other information, that the documents are actually archives that contain multiple files. One such file contains information about the document's content—the actual information that the document's author typed into the document, for example. Another such file may contain information about the fonts used in the document. Another such file may contain information about multi-language support for the document. Various other files may contain various other items of information related to the presentation of the document. Although the description herein refers to Word documents for sake of example, certain embodiments of the invention also handle documents other than Word documents, and certain editors also store these documents with different distinctive filename extensions (besides ".docx"). Examples of these other documents include Microsoft Excel documents and Microsoft PowerPoint documents.

In one embodiment of the invention, the database supports Web-based Distributed Authoring and Versioning ("WebDAV"). WebDAV is a set of extensions to the Hypertext Transfer Protocol (HTTP) that allows users to edit and manage files collaboratively on remote World Wide Web servers. The WebDAV protocol is defined in the Internet Engineering Task Force (IETF) Request for Comments (RFC) 4918, which is incorporated by reference herein. Microsoft Office 2007 communicates with a file system using the WebDAV protocol. Because the database of an embodiment of the invention also is capable of interfacing with applications using the WebDAV protocol, editors such as those found in Microsoft Office 2007 do not need to be modified extensively in order to allow those editors to communicate directly with the database instead of with a file system. Such editors may use WebDAV to access either a file system or a database such as Oracle XDB. As used herein, "editor" refers to an executing computer program that permits a user to open, edit, and save a document. A technique that uses WebDAV is described herein, but other alternative techniques may be used instead. Techniques disclosed herein are also applicable to other file system or URL-based protocols such as Hypertext Transfer Protocol, File Transfer Protocol, and Network File System.

In one embodiment of the invention, a listener process executing in the database system detects when an editor (e.g., Microsoft Word, Microsoft Excel, Microsoft PowerPoint, etc.) is attempting to use WebDAV to save a file having the ".docx" extension (signifying that the file is an archive of XML files). In response to detecting the attempt to save the ".docx" file, the process extracts, from the multi-file archive that the editor is attempting to save, the XML file that represents the content of the document (as opposed to the archive's other XML files that express the formatting information about the document). The process stores the XML content of the file in the database. For example, the XML content may be stored in one or more tables, in one or more columns of one or more tables. Each XML element may have its own separate column. Parent-child relationships in the XML document may be preserved through the user of foreign keys in columns of related database tables.

FIG. 1 is a flow diagram that illustrates an example of a technique for storing XML document data into a database, according to an embodiment of the invention. In block 102, a process detects that an editor (such as Microsoft Word 2007) is saving a document. The document may be annotated and marked-up with XML tags which indicate that specified parts of the document correspond to specified types of data that have specified attributes. The process may detect that the editor is saving the document using WebDAV, for example. In one embodiment of the invention, the process is an event listener process that executes within a database server.

In block 104, a process unzips the "docx" archive that contains the several XML files, including the content of the document itself. In block 106, a process inserts the extracted XML files into an database (such as Oracle XML Database). The data within the XML files may be stored in a binary XML table, for example. The operations of blocks 104 and 106 may be performed by executing Java code, SQL instructions, and/or PL/SQL code within a database server that is associated with the database.

Validating XML Document Data

As is mentioned above, users of Microsoft Office 2007 are given the capability to attach an XML schema to their documents. An XML schema to which all Microsoft Office 2007 documents conform is the Microsoft Office Open XML Schema. However, the Microsoft Office Open XML Schema permits users to define their own additional XML schemas as templates. More specifically, Microsoft Office 2007 allows users to define, in their templates, custom XML elements with custom attributes. Therefore, although a Microsoft Office document may conform to multiple XML schemas, that document will at least conform to the Microsoft Office Open XML Schema. For example, a user might define a template called "functional specification" that defines a schema to which all functional specification-type documents must conform. Under such circumstances, the valid functional specification documents would conform not only to the "functional specification" template schema, but also the Microsoft Office Open XML Schema.

Editors in the Microsoft Office 2007 suite permit users to define, in their templates (which are user-defined XML schemas), custom XML elements and the attributes of those XML elements. Once such templates have been defined, the editors permit users to "tag" various strings within documents with the custom XML elements. In one embodiment of the invention, whenever a document that is associated with a template or other XML schema is saved into the database, the database server performs a validation operation to determine whether the document conforms to the structure and rules that are set forth in the associated template. The database server then reports, to the user, the results of the validation operation: whether the document conforms to the associated template, or whether the document fails to conform to the associated template. In the event that a document does not conform to its associated template, the database server also, in one embodiment of the invention, displays to the user the reasons why the document does not conform to the associated template—the reasons why the document did not pass validation. For example, the database server may identify specific parts of the document that did not conform to the associated template, and may indicate which rules those parts violated.

This kind of document validation, when performed in a database, has some advantages over similar kinds of document validation that might be performed in a file system. Databases are better suited for handling very large collections of documents. In a database, each such document may be stored in a different row of one or more interrelated database tables. The database server is specifically designed to process database table rows in large volumes. File systems, in contrast, would be very inefficient at performing such processing in such large volumes.

For example, a function specification document might contain (or be associated with metadata that indicates) a name of the specification, an author of the document, a creation date of the document, a summary of the document, a status of the document (e.g., whether the document has been reviewed, whether the document is final, etc.), the identities of the users who contributed to the document, and/or the identities of the reviewers of the document. Each of these items of information may be tagged with XML tags. Under such circumstances, when the document is saved into the database, the database server performs several validation operations. For example, the database server may determine whether the string that has been tagged as a date actually is a valid date (e.g., that the month, day, and year actually correspond to a date that occurred on a calendar in the past).

For another (perhaps more interesting) example, in one embodiment of the invention, the database server determines whether the string that has been tagged as an author actually identifies an employee of a particular company. Instead of merely verifying that the content of the author element is a valid string of characters, the database server determines whether the author is an employee. In one embodiment of the invention, the database server makes this determination by consulting another table in the database—a table whose rows contain the names of all of the company's employees. If the database server finds the employee's name in the "employee" table, then the database server determines that the content of the author element is valid. Alternatively, if the database server cannot find the employee's name in the "employee" table, then the database server determines that the content of the author element is invalid—and therefore, that the document as a whole is invalid. Thus, by making use of other data that is already stored in the database, external to the document, the database server is able to perform a kind of validation that is more sophisticated than any of the simplistic kinds of validation that might have previously been performed in a file system (in which such document-external data is not readily accessible). The power of the database is leveraged.

For another example, a part of the document might be tagged as the document's status (e.g., whether the document is a draft, or has been reviewed, or is final, etc.). A company might have a rule that before a document can be merged into a core of documents, that document might have a "final" status. A document's status might change multiple times during the life of the document. Even after a document's status has been made "final," someone might make additional comments on the document, which might cause the document's status to change to a status that is more preliminary than the "final" status. In one embodiment of the invention, the database server detects whenever a particular element's data—such as the data of the "status" element—has been altered. In one embodiment of the invention, this detection involves detecting whether data that is contained in a particular text node or attribute of a node in an XMLType table, which contains at least part of the XML document data, has changed. In response to detecting that the particular element's data has been altered, the database server performs one or more operations that are associated with the particular element. For example, a user might define, in the database, a rule that states that whenever a document's "status" element is altered, a notification is automatically generated and sent (e.g., via e-mail) to the document's author and/or contributors (who also might be identified automatically based on the data of tagged XML elements in the document itself). Thus, instead of being a static document, the document becomes a "live" document that causes specified operations to be performed automatically whenever specified events occur relative to the document.

Figure 2:
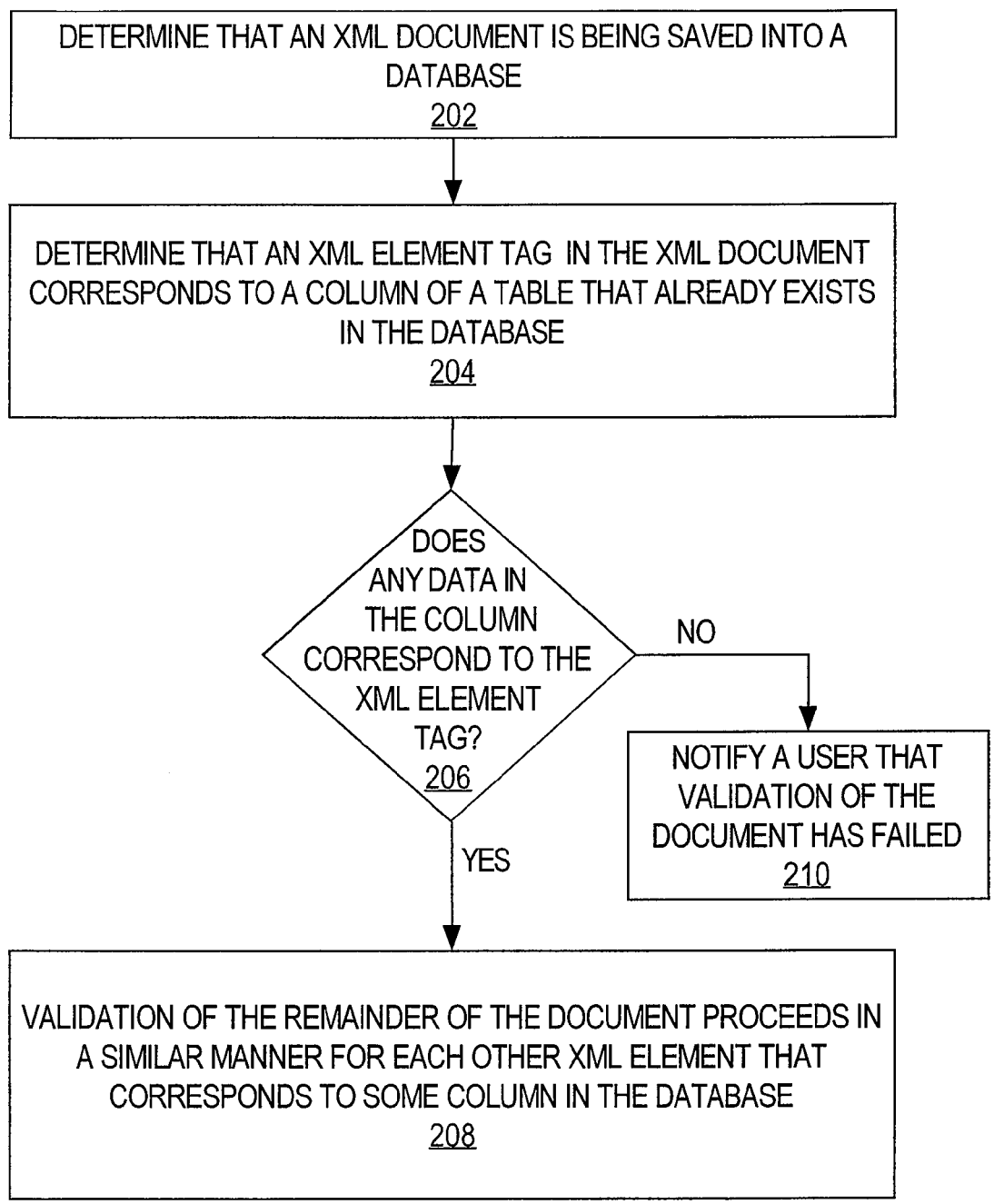
FIG. 2 is a flow diagram that illustrates an example of a technique for validating data within a document that is being saved into a database, according to an embodiment of the invention.

FIG. 2 is a flow diagram that illustrates an example of a technique for validating data within a document that is being saved into a database, according to an embodiment of the invention. In block 202, a process determines that an XML document is being saved into the database. In block 204, a process determines that an XML element tag in the XML document corresponds to a column of a table that already exists in the database. This XML element-to-relational column correspondence may be established based on user input beforehand. For example, in one embodiment of the invention, whenever a document is to be stored into the database, the database server first determines whether a user-defined XML schema has been registered for the document in the database, and, if not, then the database server asks the user to register the XML schema before proceeding further. In block 206, a process determines whether the data that corresponds to the XML element tag in the XML document (i.e., the content that is enclosed within the opening and closing XML element tags) is found within the column that corresponds to the XML element tag. If the data is found in the column, then control passes to block 208. Otherwise, control passes to block 210.

In block 208, validation of the remainder of the document proceeds in a similar manner for each other XML element that corresponds to some column in the database. The particular XML element's data is considered to be valid because the data was found in the corresponding column of a table in the database. Alternatively, in block 210, a process notifies a user that validation of the document has failed. The XML element's contents were not found in the appropriate column of the table in the database, and so the XML element's contents (and therefore the whole XML document) are known to be invalid.

Enhanced Queriability

Storing XML-tagged documents in a database also enhances the queriability of those documents. For example, within a functional specification document, a manager's name might be enclosed by "manager" XML tags, thereby identifying that the string enclosed by the tags is the manager's name. Each document in a collection of functional specification documents might contain some "manager" XML tag, but different documents might specify different managers' names. A user might be interested in finding all of the functional specification documents that specify a particular name as the manager. According to an embodiment of the invention, the database server receives, from a user, an identity of one or more tags and the desired string contents of those tags. The database server then finds, in the database, all of the documents in which the identified tags contain the user-specified strings.

For example, if a user indicates that he is interested in finding all of the functional specification documents in which the "manager" is "Nipun," this can be evaluated more efficiently in a database than in a file system if there are a number of functional specification documents since indices can be used. This kind of enhanced queriability cannot be efficiently performed by a file system.

Figure 3:
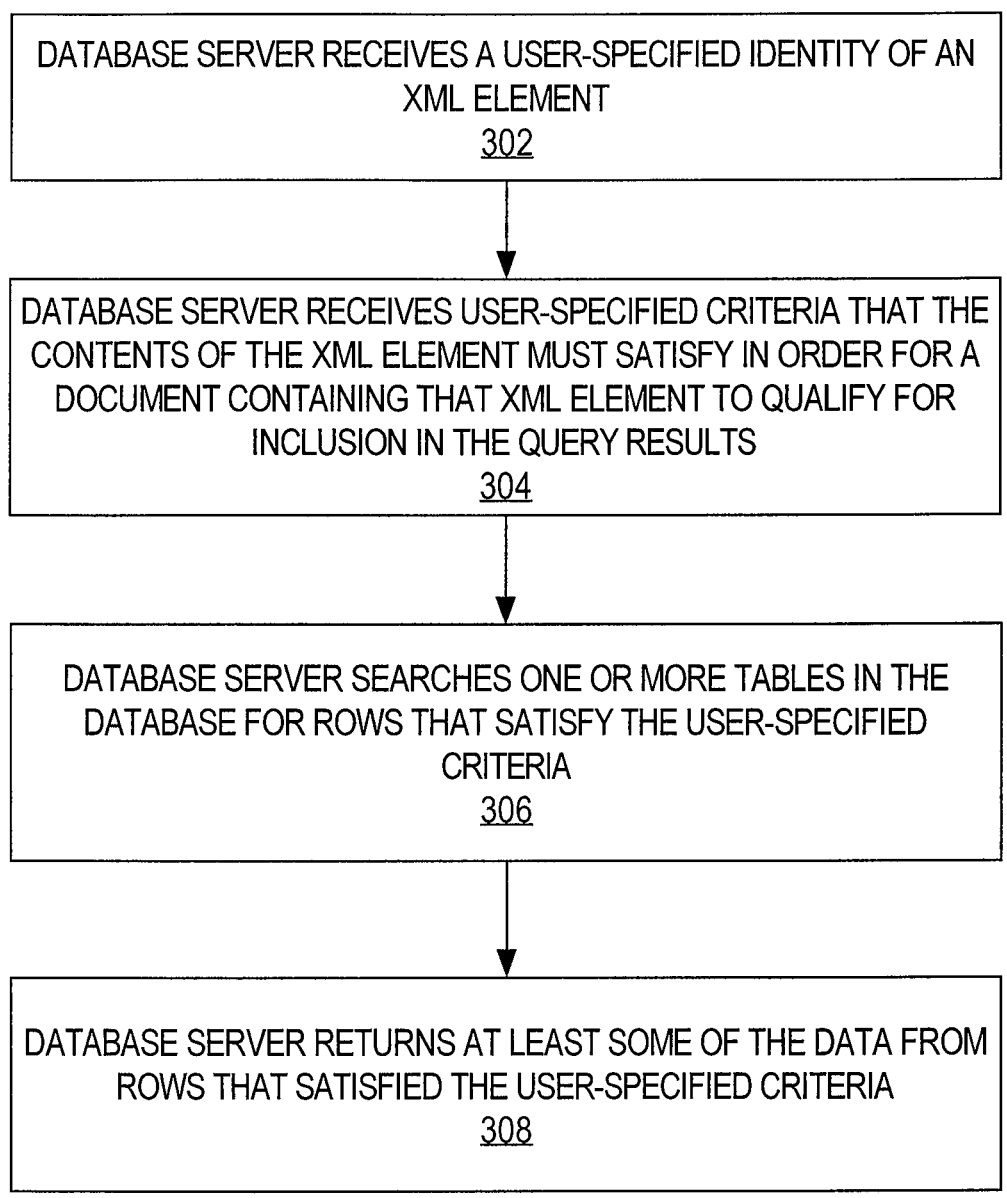
FIG. 3 illustrates an example of a technique for the enhanced querying of documents that have been stored in a database, according to an embodiment of the invention.

FIG. 3 illustrates an example of a technique for the enhanced querying of documents that have been stored in a database, according to an embodiment of the invention. In block 302, a database server receives a user-specified identity of an XML element. For example, the XML element might be a "manager" element. In block 304, the database server receives user-specified criteria that the contents of the XML element must satisfy in order for a document containing that XML element to qualify for inclusion in the query results. For example, the criteria might be that the "manager" element must contain "Nipun" in order for the document that has that element to qualify as a query result. In block 306, the database server searches one or more tables in the database for rows that satisfy the user-specified criteria. For example, the database server may search for all rows that contain "Nipun" in a "manager" column. The database server may utilize an index previously built on the "manager" column in order to perform this search quickly (more quickly than a linear scan would allow). In block 308, the database server returns, as query results, at least some of the data from the rows that satisfied the user-specified criteria. For example, the database server may reconstruct, using the data contained in the "matching" rows, the entire contents of the documents that are represented in those rows. The database server may then present these reconstructed documents to the user, while omitting from the search results any documents that did not indicate that "Nipun" was the manager.

The query results may also indicate, for each document contained in the query results, a file system path at which the user desired the document to be saved when the document was initially stored. Because the document is actually stored in the database, the document's contents might or might not actually reside at this path in the file system.

As will be seen from the discussion below, in one embodiment of the invention, less than all of each matching document may be returned; specified portions may be extracted and returned instead of the entire documents. Additionally, as will be seen from the discussion below, in one embodiment of the invention, documents may be reconstructed in any user-specified format, which may differ from the format in which the document was originally constructed and saved.

Enhanced Extraction

As is discussed above, in one embodiment of the invention, the database server is capable of querying a set of documents to determine a set that contains a specified string (or set of strings) within a specified XML element (or set of XML elements). Additionally, in one embodiment of the invention, the database server receives, from a user, an identity of one or more XML elements in whose contents the user is interested. Thus, the user can specify (a) a first set of XML elements whose contents must satisfy specified criteria in order to be included in a result set for a query, and (b) a second set of XML elements whose contents should be returned as the results of the query. For example, although the user might indicate that only documents that contain "Nipun" in the "manager" element satisfy the query, the user might also indicate that only the contents of the "abstract" element of these documents are to be returned in the query results. When the database server executes the user's query, the database server will return, as query results, the contents of the "abstract" element of every document whose "manager" element contains "Nipun" (and only those documents) rather than the entire contents of every document whose "manager" element contains "Nipun."

Significantly, in one embodiment of the invention, one or more indices are built upon the tables that store the document data (that is, the tables in which each document in the collection is stored in a separate row). Each column of a table may contain the contents of a different XML element. In one embodiment of the invention, a separate index is built for each such column. When a query is performed in which the contents of such a column are to be inspected to determine if they satisfy specified criteria, the database server uses that column's index to locate the rows that satisfy the query criteria instead of doing a linear scan on the table. For example, using the index, the table may be able to do a binary search of the table's contents in order to determine, more quickly, which rows satisfy the query criteria.

Figure 4:
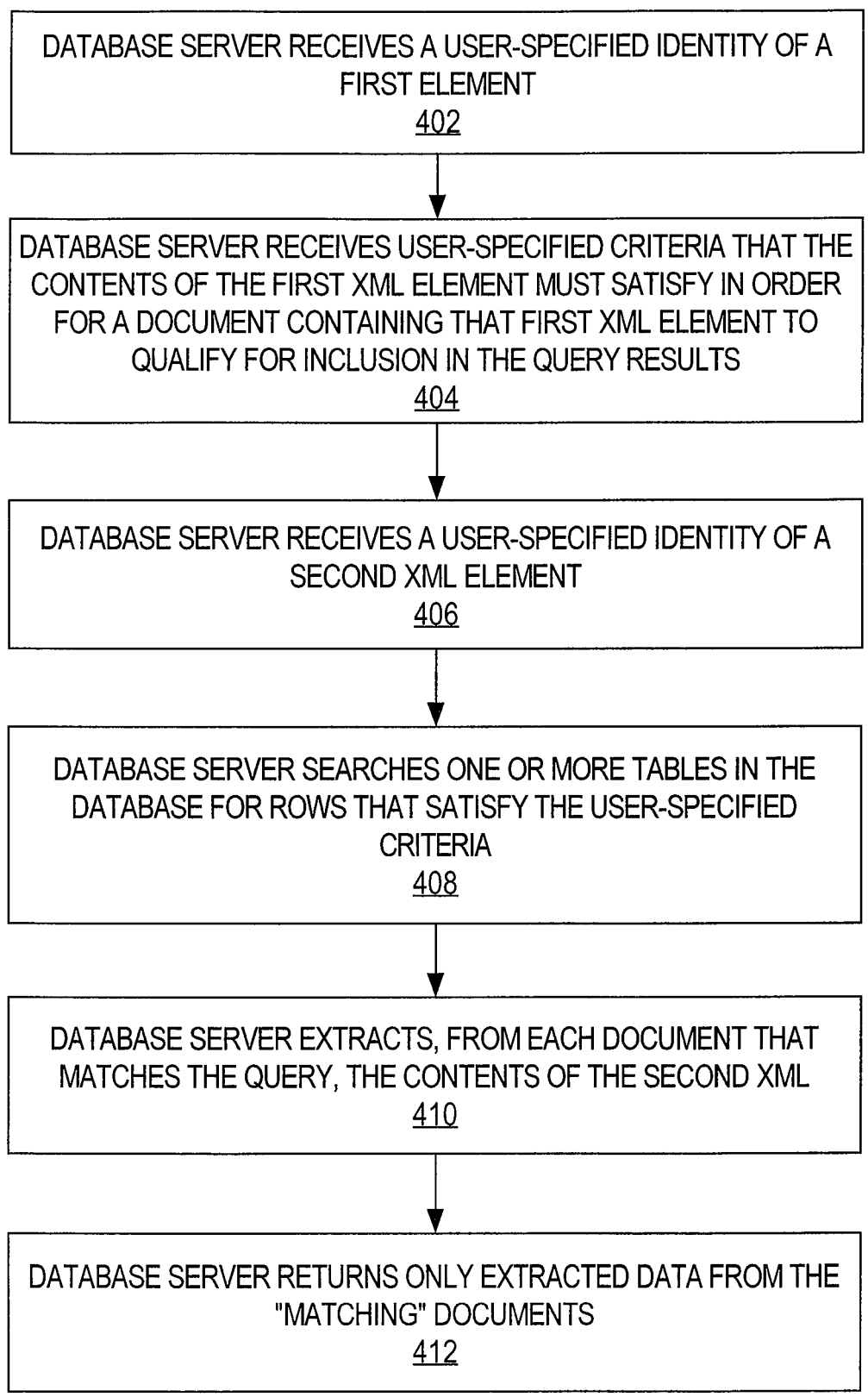
FIG. 4 illustrates an example of a technique for the enhanced extraction of specified data from documents that have been stored in a database, according to an embodiment of the invention.

FIG. 4 illustrates an example of a technique for the enhanced extraction of specified data from documents that have been stored in a database, according to an embodiment of the invention. In block 402, a database server receives a user-specified identity of a first XML element. The first XML element is the XML element whose contents are to be compared to some criterion in order to determine whether a document satisfies a query. For example, the first XML element might be a "manager" element. In block 404, the database server receives user-specified criteria that the contents of the first XML element must satisfy in order for a document containing that first XML element to qualify for inclusion in the query results. For example, the criteria might be that the "manager" element must contain "Nipun" in order for the document that has that element to qualify as a query result. In block 406, the database server receives a user-specified identity of a second XML element. The second XML element is the XML element whose contents are to be returned as query results in the event that the document that contains that element satisfies the query criteria. For example, the second XML element might be an "abstract" element whose contents indicate an abstract for the document.

In block 408, the database server searches one or more tables in the database for rows that satisfy the user-specified criteria. For example, the database server may search for all rows that contain "Nipun" in a "manager" column. The database server may utilize an index previously built on the "manager" column in order to perform this search quickly (more quickly than a linear scan would allow). In block 410, for each document that "matched" the query, as determined in block 408, the database server extracts, from that document, the contents of the second XML element as contained in that document. For example, if the second XML element is the "abstract" element, then the database server may extract the contents of the "abstract" column of each row that satisfied the query criteria.

In block 412, the database server returns, as query results, only the data that was extracted from the "matching" rows in block 410. For example, the database server may return, as query results, the abstract of each document that indicated that "Nipun" was the manager. The query results, under such circumstances, would only contain the contents of the abstract elements of each query-matching document (and only the contents of the abstract elements), and would not contain any contents of any document that did not match the query.

Dynamic Content

Documents can be of various types, such as Word documents, Excel spreadsheets, PowerPoint presentations, etc. A spreadsheet might contain separate columns for separate types of data. For example, one column might contain, for each employee, that employee's name. Another column might contain, for each employee, that employee's salary. Yet another column might contain, for each employee, the percentage of that employee's salary to which that employee is entitled as a bonus. The spreadsheet may contain each of these items of information for each employee in a separate row.

The database might already contain some tables which store data that does not come from any document. These tables may be generated entirely independently of the spreadsheet or any other document that is imported into the database. For example, the database might already contain a table in which one column contains employee names, and in which another column identifies the department to which the named employee belongs. The contents of this table might even pre-date the existence of the spreadsheet document.

It might be the case that all employees who belong to a particular department ought to receive an extra retention bonus. Because the database already identifies which employees belong to which departments, data that is already contained in the database can be leveraged in order to update the data (also stored in the database) that is used to generate the spreadsheet. After the spreadsheet's data have been stored in the tables of the database, the data can be correlated with data in another table (such as the department table) and updated based on some rule. For example, the rule might state that for every employee who belongs to a specified department, the contents of the bonus column should be updated to contain a revised value that is based on the present value. After the values have been updated in the database, the updated values are presented to the user when the document is next loaded in the editor. Thus, the document is a "live" document whose contents are dynamic rather than static.

In one embodiment of the invention, whenever an editor attempts to load a document whose contents are stored in the database, the database server detects this attempt, and automatically updates, "on the fly," the values of the tables that store the document's contents. The database server may update these values based upon user-specified rules, which may refer to and utilize the contents of other, document-external tables (e.g., the aforementioned "department" table) in the database. Thus, every time that an editor loads or opens a document, the document contains the freshest, most up-to-date and accurate data. The document is "live" and dynamic rather than static. The user sees the "snapshot" of the document data that is current as of the viewing time rather than the storage time. Additionally, the presentation of the document is separated from the document's data.

Figure 5:
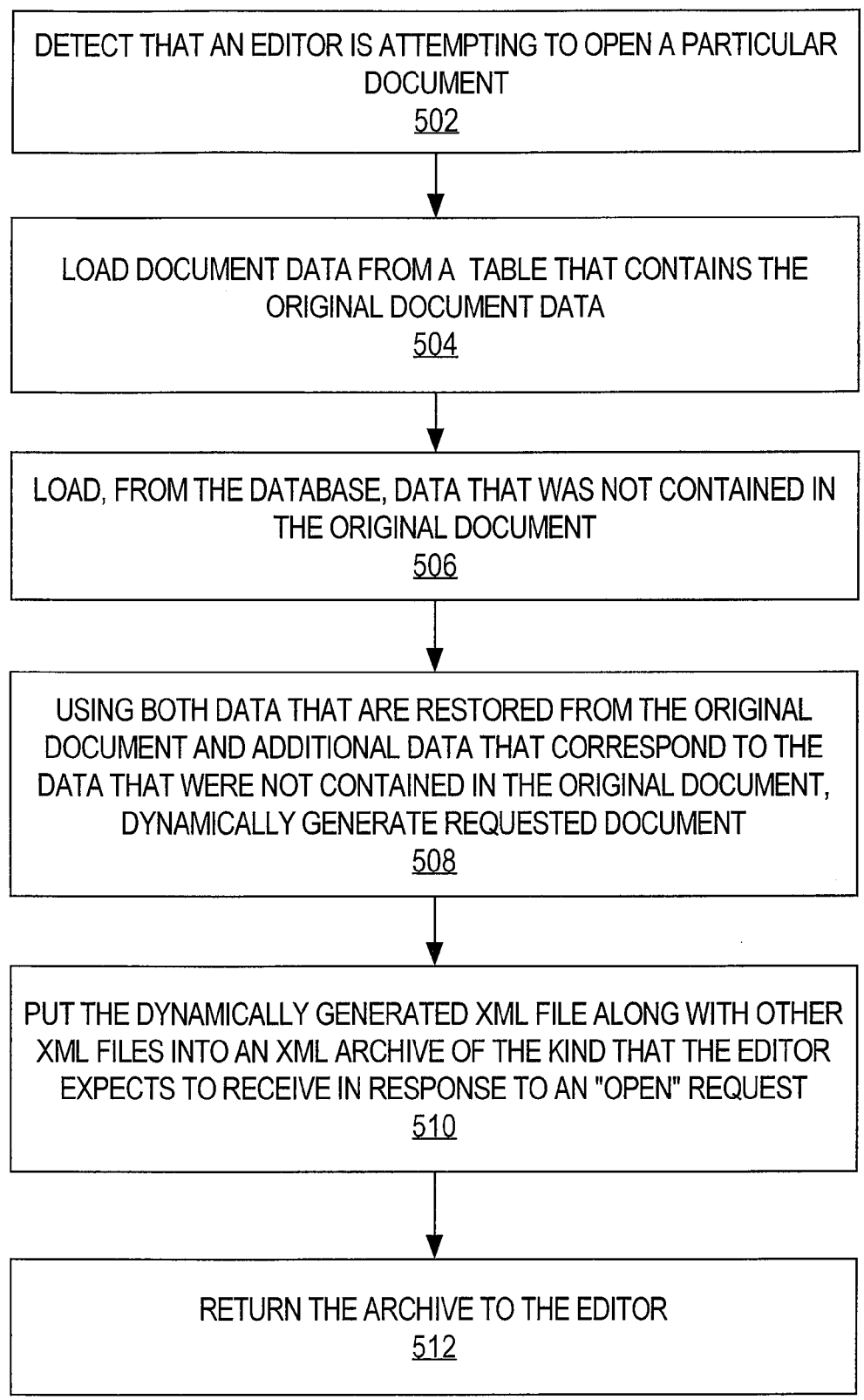
FIG. 5 is a flow chart that illustrates an example of a technique for dynamically regenerating a document "on the fly" from document data that has been stored in a database, according to an embodiment of the invention.

FIG. 5 is a flow chart that illustrates an example of a technique for dynamically regenerating a document "on the fly" from document data that has been stored in a database, according to an embodiment of the invention. In block 502, a process detects that an editor (such as Microsoft Excel 2007) is attempting to open a particular document, such as a spreadsheet. For example, the process may be an event listener process that executes in a database server. In block 504, the process loads document data from columns of a table that contain the original document data. For example, the columns originally included in the spreadsheet, and created in the table, might include an employee identifier, an employee name, and employee salary. Each row of the table may correspond to a row of the spreadsheet.

In block 506, the process additionally loads, from the same or a related (e.g., via a foreign key) table, data that was not contained in the original document. For example, the process may additionally load, from further columns of the table, bonus information for each employee, and a job title of each employee. The bonus information, for example, may be dynamically computed based on information stored in other tables; the bonus itself might not be stored as a final result, but might be computed "on the fly" from employee salary data and bonus percentage data that is stored in some table in the database.

In block 508, using both data that are restored from the original document and also the additional data that correspond to the data that were not contained in the original document—the data read in block 506—the process dynamically generates the requested document. Thus, the requested document may contain information that was not actually contained in the original document. Furthermore, the dynamically generated document may contain updated information that is more current that the data that was obtained from the original document; this may occur, for example, if the data are updated in the table after being stored from the original document.

In block 510, a process puts the dynamically generated XML file, along with other XML files that regard fonts, multi-language support, etc., into an XML archive of the kind that the editor (e.g., Microsoft Excel 2007) expects to receive in response to an "open" request. The process may invoke Java code, SQL instructions, and/or PL/SQL code to accomplish this, for example. In block 512, the process (executing in the database server) returns the archive to the editor, which may then present the enhanced document data to the user. The additional data added to the document content will, in this case, appear as additional columns in the spreadsheet when the spreadsheet is presented by the editor.

Presentation Separated from Data

Because a document's data is stored in database tables, the document's data can be presented in a variety of formats. The format in which a document is presented may be different from the format of the document from which the data was originally obtained. For example, when a spreadsheet document is saved, the data contained in the spreadsheet document may be stored in separate columns and rows in the tables of the database. The database server may then give the user the option of generating any one of several different formats of documents in which the data are presented. For example, the server may give the user the option of viewing the data within an Excel spreadsheet or within an Adobe Portable Document Format (PDF) format. Upon receiving the user's selection, the database server queries the tables to retrieve the documents' contents, and generates (possibly with the assistance of one or more external helper applications) a document whose format is of the specified type. The resulting document contains the data that was contained in the original document, but is potentially of a different format or file type than the original document.

In one embodiment of the invention, when a user selects a format in which a document is to be generated, as is discussed above, the database server (and/or some helper application) applies one or more XML stylesheets to an XML document that contains the data in order to produce the document of the appropriate format. Each different format may be associated with a different stylesheet that is to be applied to a generic "formatless" XML document (initially constructed from the relational data) in order to produce a document of that format.

Privacy

In one embodiment of the invention, different users are privileged to see different parts of a document's data. For example, a first user might be associated with a first access level, a second user might be associated with a second access level, and a third user might be associated with a third access level. Each access level may be mapped to a different set of XML elements. Users that are associated with a particular access level are allowed to see the contents of the XML elements in that access level's set of XML elements, but not the contents of any other XML element. Thus, users that are associated with the first access level might see the contents of a first set of XML elements, users that are associated with the second access level might see the contents of a second set of XML elements, and users that are associated with the third access level might see the contents of a third set of XML elements. Each such set may include different XML elements than each other such set. In one embodiment of the invention, the access control information that indicates the access levels that various users have, and that indicates the extent of access that each access level provides, is stored in the database.

For example, users that have the first access level might not be allowed to see the "name" element of a document. Therefore, when a user that has the first access level attempts to open the document, the database server determines (based on the element set that is mapped to the first access level) that the user is not permitted to see the contents of the "name" element. As a result, when the database server dynamically generates the document based on the data contained in the tables, the database server replaces the contents of the "name" element with obscuring text such as "XXX" or "[content redacted]" or similar text that indicates that the actual text is not being displayed. The contents of the rest of the XML elements of the document may be presented to the user as usual. Thus, different versions of a document may be generated for different users based on those different users' different access levels. Consequently, the privacy of certain information is maintained.

In one embodiment of the invention, instead of replacing the contents of elements that a user is not permitted to view with generic text such as "XXX," the database server replaced the contents with text that indicate the type of the element that the user is not permitted to view. For example, if the user is not permitted to view the contents of a "name" element, then when the database server generates the document based on the relational data, the database server may put, in the place of the contents of the "name" element, text such as "[name withheld]." This informs the user that the data which the user is not allowed to see is a person's name, or the contents of a "name" element. Other users of different access levels might be able to see the contents of the "name" element, but might be prevent from seeing the contents of the "address" element, for example. Thus, different versions of the document may be generated to serve different purposes and to be consumed by different audiences.

Although a file system might be able to protect the privacy of a document on the granularity of the entire document, there is apparently no file system that is capable of preventing some parts of a document from being displayed to certain users while allowing those users to view the remainder of the document.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
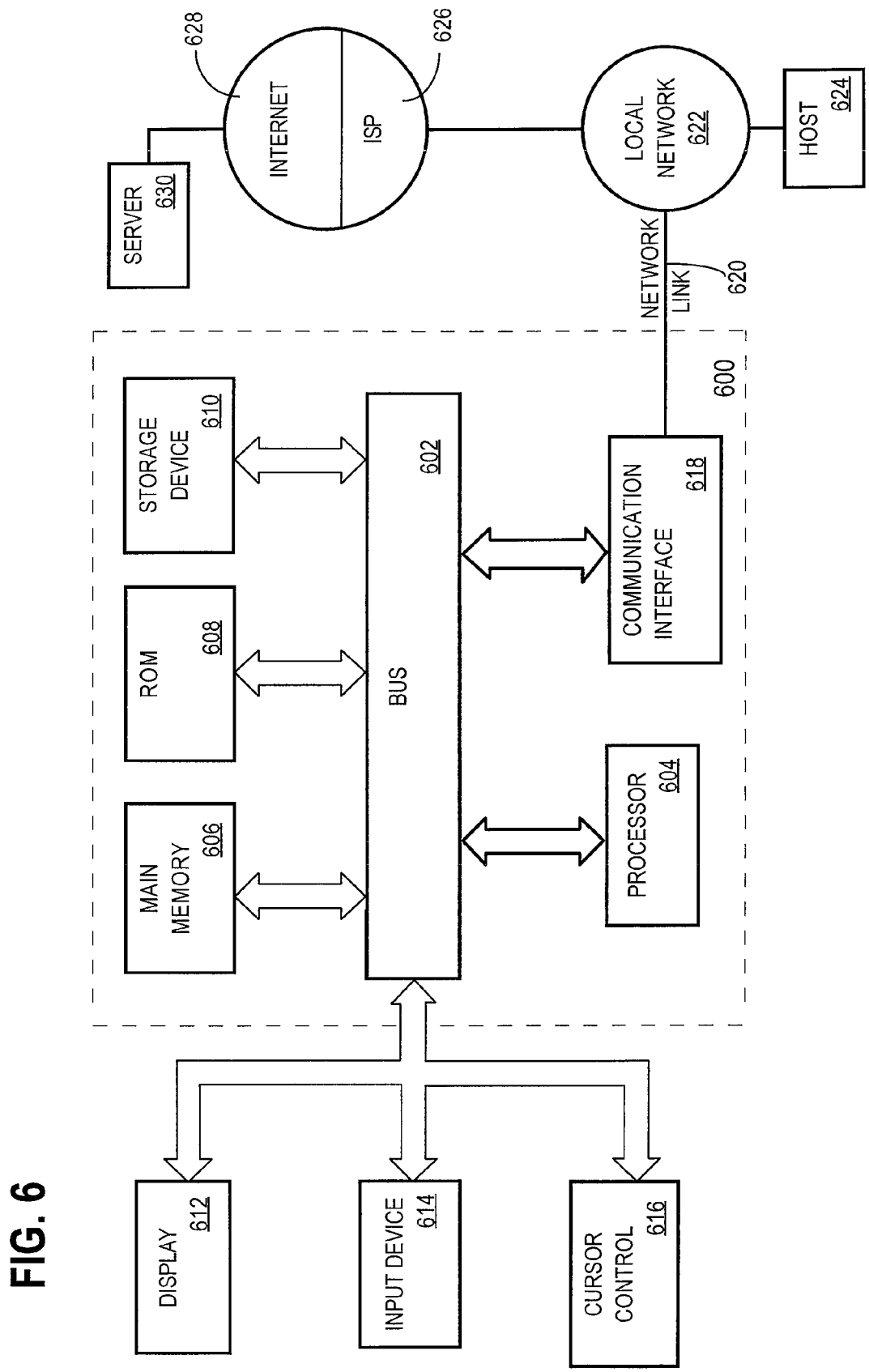
FIG. 6 is a block diagram of a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
    detecting that a document editor application, external to a database server, is attempting to save a multi-file archive document, wherein said multi-file archive document contains a plurality of extensible markup language (XML) files, wherein said plurality of XML files contains a particular XML file that contains user-inputted document content and another XML file that describes said particular XML file;
    in response to detecting that the document editor application is attempting to save the multi-file archive document:
        extracting from said multi-file archive document the particular XML file that contains user-inputted document content;

said database server storing said particular XML file that contains user-inputted document content in one or more tables of a database that said database server defines as storing XML files; and extracting from said multi-file archive document said another XML file that describes said particular XML file;

said database server storing said another XML file that describes said particular XML file in one or more tables of said database; and wherein said steps are performed by one or more computing devices.

2. The method as recited in claim 1, wherein said extracting comprises unzipping the multi-file archive document; and wherein said database server storing said particular XML file comprises the database server executing at least one of (a) Java code, (b) Structured Query Language (SQL) instructions, (c) PL/SQL code, (d) XQuery.

3. The method as recited in claim 1, further comprising:

determining that a particular XML element in XML data of the particular XML file that contains user-inputted document content corresponds to a particular column of a particular table in the database;

determining that the particular column does not contain contents that are enclosed between opening and closing tags of the particular XML element in the XML data of the particular XML file that contains user-inputted document content; and in response to determining that the particular column does not contain the contents that are enclosed between the opening and closing tags of the particular XML element, generating an indication that the XML data is not valid.

4. The method as recited in claim 1, further comprising:

detecting that a change has been made to particular data that is contained in a particular text node or attribute of a node in an XMLType table that contains at least part of XML data of the particular XML file that contains user-inputted document content;

in response to detecting that the change has been made to the particular data, determining whether a rule is associated with the particular text node or attribute; and in response to determining that the rule is associated with the particular text node or attribute, automatically performing an operation that is specified by the rule in response to the change being made to the particular data.

5. The method as recited in claim 1, further comprising:

receiving specified criteria that identify (a) at least one first XML element and (b) specified contents;

in response to receiving the specified criteria, the database server selecting, for inclusion in a set of multi-file archive documents, database-stored XML files that (a) contain an instance of the first XML element and (b) in which contents of the instance of the first XML element in those particular XML files that contain user-inputted document content match the specified contents; and the database server returning, as query results, at least a portion of each multi-file archive document in the set of multi-file archive documents.

6. The method as recited in claim 5, further comprising:

receiving an indication of one or more second XML elements;

wherein the step of returning the query results comprises returning, as query results, only contents of each instance of the one or more second XML elements in the set of multi-file archive document, without returning, as query results, any other portion of any multi-file archive document in the set of multi-file archive documents.

7. The method as recited in claim 1, further comprising:

after the database server has stored the particular XML file that contains user-inputted document content, within one or more tables of a database, updating contents of one or more columns of the one or more tables independently of the document editor application;

after updating the contents of the one or more columns, receiving a request, from the document editor application, to open a multi-file archive document;

in response to the request, generating an updated version of the multi-file archive document that reflects the contents of the one or more columns as part of said updating; and the database server sending the updated version of the multi-file archive document to the document editor application in response to the request, from the document editor application, to open the multi-file archive document.

8. The method as recited in claim 7, wherein the step of generating the updated version of the multi-file archive document comprises:

generating an enhanced version of the multi-file archive document in which information from other columns in one or more tables in the database have been added to the particular XML file that contains user-inputted document content;

wherein the information from the other columns was not specified in the particular XML file that contains user-inputted document content at a time that the document editor application attempted to store the particular XML file that contains user-inputted document content;

wherein the document editor application is a spreadsheet application; and wherein the information from the other columns already existed in one or more tables in the database prior to a time that the document editor application attempted to store the particular XML file that contains user-inputted document content.

9. The method as recited in claim 1, further comprising:

receiving an indication of a particular format in which a version of a multi-file archive document is to be generated; and in response to receiving the indication of the particular format, reading the user-inputted document content from the database and generating a version of the multi-file archive document in the particular format;

wherein the particular format differs from a multi-file archive format in which the document editor application attempted to store the multi-file archive document;

wherein said generating of said version of said multi-file archive document in said particular format comprises applying one or more XML stylesheets to the particular XML file that contains user-inputted document content.

10. The method as recited in claim 1, further comprising:

in response to a request, from the document editor application, to open a multi-file archive document that contains the particular XML file that contains user-inputted document content, the database server determining an access level of an entity that made the request;

determining one or more private XML elements that are mapped to the access level;

generating, based on access control information stored in the database, a redacted version of the multi-file archive document in which contents of the one or more private XML elements have been replaced in the multi-file archive document with information that identifies one or more names of the one or more private XML elements; and providing the redacted version of the multi-file archive document to the document editor application in response to the request to open the multi-file archive document.

11. A non-transitory computer-readable medium on which are encoded instructions which, when executed by one or more processors, cause the one or more processors to perform steps comprising:

detecting that a document editor application, external to a database server, is attempting to save a multi-file archive document, wherein said multi-file archive document contains a plurality of extensible markup language (XML) files, wherein said plurality of XML files contains a particular XML file that contains user-inputted document content and another XML file that describes said particular XML file; and in response to detecting that the document editor application is attempting to save the multi-file archive document:

extracting from said multi-file archive document the particular XML file that contains user-inputted document content;

said database server storing said particular XML file that contains user-inputted document content in one or more tables of a database that said database server defines as storing XML files;

extracting from said multi-file archive document said another XML file that describes said particular XML file; and said database server storing said another XML file that describes said particular XML file in one or more tables of said database.

12. The non-transitory computer-readable medium as recited in claim 11, wherein the steps further comprise:

wherein said extracting comprises unzipping the multi-file archive document; and wherein said database server storing said particular XML file comprises the database server executing at least one of (a) Java code, (b) Structured Query Language (SQL) instructions, (c) PL/SQL code, (d) XQuery.

13. The non-transitory computer-readable medium as recited in claim 11, wherein the steps further comprise:

determining that a particular XML element in XML data of the particular XML file that contains user-inputted document content corresponds to a particular column of a particular table in the database;

determining that the particular column does not contain contents that are enclosed between opening and closing tags of the particular XML element in the XML data of the particular XML file that contains user-inputted document content; and in response to determining that the particular column does not contain the contents that are enclosed between the opening and closing tags of the particular XML element, generating an indication that the XML data is not valid.

14. The non-transitory computer-readable medium as recited in claim 11, wherein the steps further comprise:

detecting that a change has been made to particular data that is contained in a particular text node or attribute of a node in an XMLType table that contains at least part of XML data of the particular XML file that contains user-inputted document content;

in response to detecting that the change has been made to the particular data, determining whether a rule is associated with the particular text node or attribute; and in response to determining that the rule is associated with the particular text node or attribute, automatically performing an operation that is specified by the rule in response to the change being made to the particular data.

15. The non-transitory computer-readable medium as recited in claim 11, wherein the steps further comprise:

receiving specified criteria that identify (a) at least one first XML element and (b) specified contents;

in response to receiving the specified criteria, the database server selecting, for inclusion in a set of multi-file archive documents, database-stored XML files that (a) contain an instance of the first XML element and (b) in which contents of the instance of the first XML element in those particular XML files that contain user-inputted document content match the specified contents; and the database server returning, as query results, at least a portion of each multi-file archive document in the set of multi-file archive documents.

16. The non-transitory computer-readable medium as recited in claim 15, wherein the steps further comprise:

receiving an indication of one or more second XML elements;

wherein the step of returning the query results comprises returning, as query results, only contents of each instance of the one or more second XML elements in the set of multi-file archive document, without returning, as query results, any other portion of any multi-file archive document in the set of multi-file archive documents.

17. The non-transitory computer-readable medium as recited in claim 11, wherein the steps further comprise:

after the database server has stored the particular XML file that contains user-inputted document content, within one or more tables of a database, updating contents of one or more columns of the one or more tables independently of the document editor application;

after updating the contents of the one or more columns, receiving a request, from the document editor application, to open a multi-file archive document;

in response to the request, generating an updated version of the multi-file archive document that reflects the contents of the one or more columns as part of said updating; and the database server sending the updated version of the multi-file archive document to the document editor application in response to the request, from the document editor application, to open the multi-file archive document.

18. The non-transitory computer-readable medium as recited in claim 17, wherein the step of generating the updated version of the multi-file archive document comprises:

generating an enhanced version of the multi-file archive document in which information from other columns in one or more tables in the database have been added to the particular XML file that contains user-inputted document content;

wherein the information from the other columns was not specified in the particular XML file that contains user-inputted document content at a time that the document editor application attempted to store the particular XML file that contains user-inputted document content;

wherein the document editor application is a spreadsheet application; and wherein the information from the other columns already existed in one or more tables in the database prior to a time that the document editor application attempted to store the particular XML file that contains user-inputted document content.

19. The non-transitory computer-readable medium as recited in claim 11, wherein the steps further comprise:
receiving an indication of a particular format in which a version of a multi-file archive document is to be generated; and
in response to receiving the indication of the particular format, reading the user-inputted document content from the database and generating a version of the multi-file archive document in the particular format;
wherein the particular format differs from a multi-file archive format in which the document editor application attempted to store the multi-file archive document;
wherein said generating of said version of said multi-file archive document in said particular format comprises applying one or more XML stylesheets to the particular XML file that contains user-inputted document content.

20. The non-transitory computer-readable medium as recited in claim 11, wherein the steps further comprise:
in response to a request, from the document editor application, to open a multi-file archive document that contains the particular XML file that contains user-inputted document content, the database server determining an access level of an entity that made the request;
determining one or more private XML elements that are mapped to the access level;
generating, based on access control information stored in the database, a redacted version of the multi-file archive document in which contents of the one or more private XML elements have been replaced in the multi-file archive document with information that identifies one or more names of the one or more private XML elements; and
providing the redacted version of the multi-file archive document to the document editor application in response to the request to open the multi-file archive document.

* * * * *